United States Patent
Saito et al.

(10) Patent No.: US 9,243,177 B2
(45) Date of Patent: Jan. 26, 2016

(54) WORKING FLUID COMPOSITION FOR REFRIGERATOR, REFRIGERATION OIL, AND METHOD FOR PRODUCING SAME

(71) Applicant: JX NIPPON OIL & ENERGY CORPORATION, Tokyo (JP)

(72) Inventors: Masanori Saito, Tokyo (JP); Fumiyuki Nara, Tokyo (JP); Tomonari Matsumoto, Tokyo (JP); Kuniko Adegawa, Tokyo (JP)

(73) Assignee: JX NIPPON OIL & ENERGY CORPORATION, Tokyo (JP)

( * ) Notice: Subject to any disclaimer, the term of this patent is extended or adjusted under 35 U.S.C. 154(b) by 0 days.

(21) Appl. No.: 14/381,800

(22) PCT Filed: Feb. 28, 2013

(86) PCT No.: PCT/JP2013/055437
§ 371 (c)(1),
(2) Date: Aug. 28, 2014

(87) PCT Pub. No.: WO2013/129579
PCT Pub. Date: Sep. 6, 2013

(65) Prior Publication Data
US 2015/0014574 A1    Jan. 15, 2015

(30) Foreign Application Priority Data

Mar. 2, 2012 (JP) .................. 2012-046997

(51) Int. Cl.
*C09K 5/04* (2006.01)
*C10M 171/00* (2006.01)

(52) U.S. Cl.
CPC ............ *C09K 5/042* (2013.01); *C10M 171/008* (2013.01); *C09K 2205/12* (2013.01); *C10M 2203/1006* (2013.01); *C10M 2203/1045* (2013.01); *C10M 2203/1065* (2013.01); *C10M 2205/0285* (2013.01); *C10M 2205/223* (2013.01); *C10M 2207/04* (2013.01); *C10M 2207/046* (2013.01); *C10M 2207/283* (2013.01); *C10M 2207/289* (2013.01); *C10M 2223/04* (2013.01); *C10M 2223/041* (2013.01); *C10N 2220/022* (2013.01); *C10N 2220/303* (2013.01); *C10N 2230/02* (2013.01); *C10N 2230/60* (2013.01); *C10N 2240/30* (2013.01)

(58) Field of Classification Search
CPC ............... C09K 5/045; C09K 2205/24; C09K 2205/122; C09K 2205/104
USPC ............................................. 252/68; 508/506
See application file for complete search history.

(56) References Cited

U.S. PATENT DOCUMENTS

| | | | | |
|---|---|---|---|---|
| 2002/0193262 | A1* | 12/2002 | Kaimai et al. | 508/485 |
| 2003/0027729 | A1 | 2/2003 | Kaimai et al. | |
| 2007/0275865 | A1* | 11/2007 | Tagawa et al. | 508/438 |
| 2009/0062167 | A1 | 3/2009 | Kaneko | |
| 2009/0072188 | A1 | 3/2009 | Machado | |
| 2010/0237274 | A1 | 9/2010 | Ota et al. | |
| 2011/0049008 | A1* | 3/2011 | Tagawa et al. | 208/18 |
| 2011/0049009 | A1* | 3/2011 | Tagawa et al. | 208/18 |
| 2011/0218131 | A1* | 9/2011 | Tsujimoto et al. | 508/382 |

FOREIGN PATENT DOCUMENTS

| | | |
|---|---|---|
| CN | 1260824 | 7/2000 |
| JP | 62-158795 | 7/1987 |
| JP | 02-029495 | 1/1990 |
| JP | 10-130685 | 5/1998 |
| JP | 2001-200285 | 7/2001 |
| JP | 2003-041278 | 2/2003 |
| JP | 2006-275013 | 10/2006 |
| JP | 2008-056800 | 3/2008 |
| JP | 2010-065191 | 3/2010 |
| WO | 2007/003024 | 1/2007 |

OTHER PUBLICATIONS

International Search Report of PCT/JP2013/055437 mailed May 14, 2013.
International Preliminary Report on Patentability of PCT/JP2013/055437 mailed Sep. 12, 2014.
Chinese Office action for CN Patent Application No. 201380012095.2, which was mailed on Apr. 27, 2015.
Search Report for EP Application No. 13754583.6, which was mailed on Apr. 17, 2015.

* cited by examiner

*Primary Examiner* — Douglas M C Ginty
(74) *Attorney, Agent, or Firm* — Greenblum & Bernstein, P.L.C.

(57) ABSTRACT

The working fluid composition for a refrigerating machine of the present invention comprises: a refrigerating machine oil comprising a mineral oil and an alkylbenzene in a mass ratio, the mineral oil/the alkylbenzene, of 85/15 to 15/85, wherein the mineral oil has a % $C_N$ by n-d-M ring analysis of 20 to 60, a pour point of −15° C. or less and a kinematic viscosity at 40° C. of 1.5 to 15 mm²/s; and a hydrocarbon refrigerant having 2 to 4 carbon atoms, wherein the refrigerating machine oil having a kinematic viscosity at 40° C. of 2 to 12 mm²/s and a flash point of 120° C. or more.

8 Claims, No Drawings ated machine oil that can save power when used in a reciprocating compressor (see Patent Literature 2). A polyol ester (POE) and the like have been proposed as the ester oil (see Patent Literature 3).

WORKING FLUID COMPOSITION FOR REFRIGERATOR, REFRIGERATION OIL, AND METHOD FOR PRODUCING SAME

TECHNICAL FIELD

The present invention relates to a working fluid for a refrigerating machine that uses, as a refrigerant, an environmentally friendly hydrocarbon having an extremely low global warming potential, such as ethane, propane, butane and isobutane, and refrigerating machine oil (a lubricating oil for a refrigerating machine) and a method for manufacturing the same, and more particularly, it relates to a refrigerating machine oil that does not cause wear even if its viscosity is lowered for power saving of a refrigeration system, has high reliability and is compatible with the system.

BACKGROUND ART

In conventional refrigerating machines, air conditioners, cold storage chambers and the like, freon containing fluorine and chlorine was used as a refrigerant. Examples of the freon include chlorofluorocarbon (CFC) such as R-11 (trichloromonofluoromethane) or R-12 (dichlorodifluoromethane), and hydrochlorofluorocarbon (HCFC) such as R-22 (monochlorodifluoromethane).

However, the production and use of the freon have been internationally regulated due to a recent problem of ozone layer depletion, and a novel hydrogen-containing freon refrigerant not containing chlorine is started to be used instead of the conventional freon nowadays. Examples of the hydrogen-containing freon refrigerant include tetrafluoroethane (R-134 or R-134a) and a mixed refrigerant of hydrofluorocarbon (HFC) such as R410A or R407C.

Although the HFC does not deplete the ozone layer, however, it has a high greenhouse effect, and hence is not necessarily an excellent refrigerant from the viewpoint of global warming that has become a recent problem.

Therefore, a lower hydrocarbon having 2 to 4 carbon atoms has been recently gathering attention because it does not deplete the ozone layer and causes an extremely small influence on the global warming as compared with the aforementioned chlorine or non-chlorine fluorocarbon refrigerants. For example, isobutane (R600a) is already used as a refrigerant for a cold storage chamber, and a refrigerating machine using an isobutane refrigerant is spreading worldwide. Besides, a lower hydrocarbon compound is now being examined to be used, as a refrigerant, in a refrigeration system having high cooling efficiency such as a room air conditioner or an industrial refrigerating machine including a compressor, a condenser, a throttle device, an evaporator and the like, which has been developed with the freon refrigerant. Such a hydrocarbon refrigerant has a global warming potential (GWP) of $1/100$ or less and is highly efficient as compared with R410A that is a mixed refrigerant of hydrofluorocarbon (HFC) currently widely used as a refrigerant for a room air conditioner. In particular, there is a possibility that use of propane (R290) having 3 carbon atoms can largely and economically reduce the influence on the global warming without requiring large-scaled design change of a room air conditioner.

As a refrigerating machine oil for the lower hydrocarbon refrigerant, a mineral oil of, for example, a naphthene- or paraffin-based mineral oil, an alkylbenzene oil, an ester oil, an ether oil and a fluorinated oil having compatibility with the refrigerant have been proposed (see Patent Literature 1). Among these refrigerating machine oils, the alkylbenzene oil, that is, a synthetic hydrocarbon, is expected as a refriger-

CITATION LIST

Patent Literature

Patent Literature 1: Japanese Patent Application Laid-Open No. 10-130685
Patent Literature 2: International Publication No. WO2007/003024 A1
Patent Literature 3: Japanese Patent Application Laid-Open No. 2003-41278

SUMMARY OF INVENTION

Technical Problem

However, the above-described hydrocarbon refrigerant is combustible, and therefore, there are a problem of technical development for using it safely, and a problem of selection, as a lubricant, of a refrigerating machine oil compatible with this refrigerant.

Meanwhile, the power saving of a refrigerating machine is significant also from the viewpoint of global environment protection. One of the countermeasures is reduction of a friction force on a sliding portion of a refrigerating machine. For this purpose, it is effective to lower the viscosity of a refrigerating machine oil, namely, viscosity lowering is effective. If the viscosity of a refrigerating machine oil is lowered, however, an oil film formed on the sliding portion becomes thin, and hence, wear is easily caused and reliability is lowered. Besides, if the viscosity of a refrigerating machine oil is lowered, the flash point of the refrigerating machine oil is lowered, which also causes a problem of safety.

When the compatibility with a hydrocarbon refrigerant of the above-described conventional refrigerating machine oils is examined in consideration of these technical problems, all of them still have room for improvements. For example, a mineral oil-based low viscosity oil has a low flash point, and since drying process at a high temperature, namely, at approximately 120° C., is performed after sealing the oil in producing a compressor, there is a fear of a safety problem. Since the high pressure viscosity of the alkylbenzene is small, an oil film formed in an elastic fluid lubrication region is thin, and hence, the alkylbenzene has a problem of lubricity. When the viscosity of the ester is lowered, a fatty acid with a short carbon chain is unavoidably used, and hence, the ester is easily hydrolyzed and inferior in stability.

In consideration of the problems of the above-described conventional techniques, an object is to provide a refrigerating machine oil that has a flash point sufficiently high for ensuring safety even if the viscosity is lowered, has appropriate compatibility with a hydrocarbon refrigerant, can retain an oil film thickness not impairing lubricity, and is excellent in stability and an electrical insulating property; a method for manufacturing the same; and a working fluid composition for a refrigerating machine using the refrigerating machine oil.

Solution to Problem

In order to achieve the aforementioned object, the present inventor has made earnest studies, resulting in finding that a low viscosity oil comprising, in a prescribed ratio, a specific mineral oil containing a comparatively large number of naphthene rings and an alkylbenzene, which is a synthetic hydrocarbon, shows no problem in safety because their disadvantages are compensated with each other, has proper compatibility with a hydrocarbon refrigerant, has good lubricity, high stability and low hygroscopicity, and is excellent as a refrigerating machine oil for a hydrocarbon refrigerant such as propane or isobutane, and thus, the present invention was accomplished.

Specifically, the present invention provides a working fluid composition for a refrigerating machine according to the following [1] to [6], a refrigerating machine oil according to the following [7], and a method for manufacturing a refrigerating machine oil according to the following [8].

[1] A working fluid composition for a refrigerating machine comprising: a refrigerating machine oil comprising a mineral oil and an alkylbenzene in a mass ratio, the mineral oil/the alkylbenzene, of 85/15 to 15/85, wherein the mineral oil has a % $C_N$ by n-d-M ring analysis of 20 to 60, a pour point of −15° C. or less and a kinematic viscosity at 40° C. of 1.5 to 15 mm$^2$/s; and a hydrocarbon refrigerant having 2 to 4 carbon atoms, the refrigerating machine oil having a kinematic viscosity at 40° C. of 2 to 12 mm$^2$/s and a flash point of 120° C. or more.

[2] The working fluid composition for a refrigerating machine according to [1], wherein the alkylbenzene is a linear alkylbenzene in which a linear alkyl group is bonded to a benzene ring, and wherein a kinematic viscosity at 40° C. of the alkylbenzene is 2 to 10 mm$^2$/s.

[3] The working fluid composition for a refrigerating machine according to [1] or [2], wherein the % $C_N$ by the n-d-M ring analysis of the mineral oil is 40 to 60.

[4] The working fluid composition for a refrigerating machine according to any one of [1] to [3], further comprising at least one glycerin derivative selected from an ester compound of glycerin and an ether compound of glycerin, wherein a content of the glycerin derivative is 0.005 to 1.0% by mass based on a total amount of the refrigerating machine oil.

[5] The working fluid composition for a refrigerating machine according to any one of [1] to [4], further comprising at least one phosphorus compound selected from a mono(alkylphenyl) diphenyl phosphate having one alkyl group having 3 to 5 carbon atoms, a di(alkylphenyl) phenyl phosphate having two alkyl groups having 3 to 5 carbon atoms, and a tri(alkylphenyl) phosphate having three alkyl groups having 3 to 5 carbon atoms, wherein a content of the phosphorus compound is 0.05 to 3.0% by mass based on a total amount of the refrigerating machine oil.

[6] The working fluid composition for a refrigerating machine according to any one of [1] to [5], wherein the hydrocarbon refrigerant is isobutane.

[7] A refrigerating machine oil comprising a mineral oil and an alkylbenzene, in a mass ratio, the mineral oil/the alkylbenzene, of 85/15 to 15/85, wherein the mineral oil has a % $C_N$ by n-d-M ring analysis of 20 to 60, a pour point of −15° C. or less and a kinematic viscosity at 40° C. of 1.5 to 15 mm$^2$/s, the refrigerating machine oil having a kinematic viscosity at 40° C. of 2 to 12 mm$^2$/s and a flash point of 120° C. or more, and the refrigerating machine oil being used with a hydrocarbon refrigerant having 2 to 4 carbon atoms.

[8] A method for manufacturing a refrigerating machine oil comprising a step of mixing a mineral oil and an alkylbenzene in a mass ratio, the mineral oil/the alkylbenzene, of 85/15 to 15/85, to obtain a refrigerating machine oil comprising a mixed oil of the mineral oil and the alkylbenzene as a base oil and having a kinematic viscosity at 40° C. of 2 to 12 mm$^2$/s and a flash point of 120° C. or more, wherein the mineral oil has a % $C_N$ by n-d-M ring analysis of 20 to 60, a pour point of −15° C. or less and a kinematic viscosity at 40° C. of 1.5 to 15 mm$^2$/s, the refrigerating machine oil being used with a hydrocarbon refrigerant having 2 to 4 carbon atoms.

Advantageous Effects of Invention

The present invention makes it possible to provide a refrigerating machine oil that has a flash point sufficiently high for ensuring safety even if the viscosity is lowered, has appropriate compatibility with a hydrocarbon refrigerant, can retain an oil film thickness not impairing lubricity, and is excellent in stability and an electrical insulating property, a method for manufacturing the same, and a working fluid composition for a refrigerating machine using the refrigerating machine oil.

More specifically, according to the present invention, even if the kinematic viscosity at 40° C. of the refrigerating machine oil is lowered to 2 to 12 mm$^2$/s for power saving of a refrigeration apparatus, the refrigerating machine oil has no problem of safety because of the flash point of 120° C. or more, has proper compatibility with a hydrocarbon refrigerant, has not only excellent lubricity, that is one of significant characteristics, but also a high electrical insulating property, low hygroscopicity and high stability, and therefore, a remarkable effect that the refrigerating machine oil is excellent in comprehensive performances as a refrigerating machine oil is achieved.

DESCRIPTION OF EMBODIMENTS

Preferred embodiments of the present invention will now be described in detail.

[Embodiment 1: Refrigerating Machine Oil and Method for Manufacturing the Same]

A refrigerating machine oil according to Embodiment 1 of the present invention comprises a mineral oil and an alkylbenzene, in a mass ratio, the mineral oil/the alkylbenzene, of 85/15 to 15/85, wherein the mineral oil has a % $C_N$ by n-d-M ring analysis of 20 to 60, a pour point of −15° C. or less and a kinematic viscosity at 40° C. of 1.5 to 15 mm$^2$/s, the refrigerating machine oil has a kinematic viscosity at 40° C. of 2 to 12 mm$^2$/s and a flash point of 120° C. or more, and is used with a hydrocarbon refrigerant having 2 to 4 carbon atoms.

A method for manufacturing a refrigerating machine oil according to Embodiment 1 of the present invention comprises a step of mixing a mineral oil and an alkylbenzene in a mass ratio, the mineral oil/the alkylbenzene, of 85/15 to 15/85, to obtain a refrigerating machine oil comprising a mixed oil of the mineral oil and the alkylbenzene as a base oil and having a kinematic viscosity at 40° C. of 2 to 12 mm$^2$/s and a flash point of 120° C. or more, wherein the mineral oil has a % $C_N$ by n-d-M ring analysis of 20 to 60, a pour point of −15° C. or less and a kinematic viscosity at 40° C. of 1.5 to 15 mm$^2$/s, and wherein the refrigerating machine oil is used with a hydrocarbon refrigerant having 2 to 4 carbon atoms.

In a refrigeration compressor, a sliding portion is an elastic fluid lubrication region in many cases, and it is necessary to select a base stock having a high viscosity-pressure coefficient for retaining a thick oil film in this region. Therefore, in the present embodiment, the % $C_N$ by the n-d-M ring analysis of the mineral oil is in a range of 20 to 60, preferably 35 to 50, and more preferably 40 to 50. Alternatively, the % $C_N$ is in a range of preferably 35 to 60 and further more preferably 40 to 60. In the case where the % $C_N$ of the mineral oil falls in the aforementioned range, if a pressure is applied to the refrigerating machine oil due to load applied in the sliding portion, the viscosity is increased and the oil film can be made thick.

A % $C_N$ by the n-d-M ring analysis herein means a value measured in accordance with ASTM D3238.

The pour point of the mineral oil is −15° C. or less, preferably −25° C. or less, and more preferably −40° C. or less from the viewpoint of a low temperature characteristic necessary as a refrigerating machine oil. A pour point herein means a value measured in accordance with JIS K2269.

The kinematic viscosity at 40° C. of the mineral oil is 1.5 to 15 mm$^2$/s, preferably 3 to 10 mm$^2$/s, and more preferably 3 to 7 mm$^2$/s from the viewpoint of power saving. A kinematic viscosity at 40° C. herein means a value measured in accordance with JIS K2283.

Examples of the mineral oil used in the present embodiment include mineral oils having % $C_N$ by the n-d-M ring analysis, pour points and kinematic viscosities at 40° C. respectively falling in the aforementioned ranges, among those obtained by refining, for example, lubricating oil fractions resulted from atmospheric distillation and/or distillation under reduced pressure of crude oil by a single refining treatment or a combination of two or more refining treatments selected from solvent deasphalting, solvent extraction, hydrogenation refining, hydro-cracking, hydrogenation isomerization, solvent dewaxing, catalytic dewaxing, sulfuric acid washing, a clay treatment, and the like.

With respect to the respective properties of the base oil of the mineral oil, the aforementioned ranges can be attained for the kinematic viscosity by adjusting the conditions of the distillation under reduces pressure, for the % $C_N$ by the n-d-M ring analysis by adjusting the conditions of the solvent extraction, the hydrogenation refining and the hydro-cracking, and for the pour point by adjusting the conditions of the hydrogenation isomerization, the solvent dewaxing and the catalytic dewaxing.

The refrigerating machine oil of the present embodiment further contains the alkylbenzene in addition to the above-described mineral oil. In the present embodiment, either of a branched alkylbenzene in which an alkyl group bonded to a benzene ring is a branched alkyl group, and a linear alkylbenzene in which an alkyl group bonded to a benzene ring is a linear alkyl group may be used, but a linear alkylbenzene is preferred because the viscosity change depending on temperature of this alkylbenzene is small. The number of carbon atoms of the alkyl group is preferably 1 to 30 and more preferably 4 to 20 from the viewpoint of suitable viscosity as a base oil of a lubricating oil. The number of alkyl groups contained per molecule of the alkylbenzene depends upon the number of carbon atoms of the alkyl group, but is preferably 1 to 4 and more preferably 1 to 3 for attaining the viscosity falling in the above-described range.

The kinematic viscosity at 40° C. of the alkylbenzene is preferably 3 to 10 mm$^2$/s, more preferably 4 to 9 mm$^2$/s, and further more preferably 4 to 6 mm$^2$/s from the viewpoint that the viscosity of the refrigerating machine oil attained after adding an additive is lowered to be used as a power saving type oil.

Besides, the mass ratio between the above-described specific mineral oil and the alkylbenzene (mineral oil/alkylbenzene) is 85/15 to 15/85, preferably 70/30 to 30/70, and more preferably 60/40 to 40/60. When the mass ratio therebetween falls in such a range, a refrigerating machine oil that has a flash point sufficiently high for ensuring safety even if the viscosity is lowered, has appropriate compatibility with a hydrocarbon refrigerant, can retain an oil film thickness not impairing lubricity, and is excellent in stability and an electrical insulating property can be realized. If the ratio of the alkylbenzene is smaller than the aforementioned range, the flash point is lowered as a result of the viscosity lowering of the refrigerating machine oil due to the characteristic of the mineral oil having a molecular weight distribution, and it is apprehended that such a refrigerating machine oil cannot be actually used for manufacturing a refrigeration compressor. On the other hand, if the ratio of the alkylbenzene is larger than the aforementioned range, it is apprehended that the compatibility with an organic material used in the compressor is lowered due to the characteristic of the alkylbenzene.

For mixing the mineral oil and the alkylbenzene, since both of them are hydrocarbon oils, a general lubricating oil mixing method can be employed, and either batch process using a mixing tank or high-throughput flow process using a cornell machine or the like in which these oils are allowed to flow in a pipe to be stirred and mixed by a baffle plate may be employed.

The kinematic viscosity at 40° C. of the refrigerating machine oil of the present embodiment is 2 to 12 mm$^2$/s, more preferably 2 to 8 mm$^2$/s, and further more preferably 4 to 6 mm$^2$/s from the viewpoint of the power saving.

The flash point of the refrigerating machine oil of the present embodiment is 120° C. or more, preferably 125° C. or more, and more preferably 130° C. or more from the viewpoint of the safety.

The refrigerating machine oil of the present embodiment may consist of a mixed base oil containing the specific mineral oil and the alkylbenzene, and may further comprise, if necessary, any of base oils and additives described below. When the refrigerating machine oil further contains any of the base oils and additives described below, the content of the above-described mixed base oil is preferably 90% by mass or more and more preferably 95% by mass or more based on the total amount of the refrigerating machine oil.

The refrigerating machine oil of the present embodiment may be appropriately mixed with an ester such as a polyol ester (POE) or a diester, an ether such as a polyalkylene glycol (PAG) or a polyvinyl ether (PVE), a mineral oil other than the above-described specific mineral oil, and a hydrocarbon-based synthetic oil other than the alkylbenzene such as poly-α-olefin (PAO) as long as the function as a refrigerating machine oil can be satisfied.

The refrigerating machine oil of the present embodiment can further comprise a compound having an oiling effect. In this manner, even if a lubrication state in the sliding portion is in a mixed lubrication region in which partial metal/metal contact occurs, good lubricity can be attained. As the compound having an oiling effect, at least one type of glycerin derivative selected from an ester compound of glycerin and an ether compound of glycerin is preferred because such a glycerin derivative is easily adsorbed to the surface of the sliding portion, does not affect the safety, and has a large abrasion resistance effect.

As the ester compound of glycerin, an ester compound in which not all hydroxyl groups form an ester bond (namely, a partial ester) is preferred, and a carboxylic acid constituting the ester is preferably a fatty acid, particularly a fatty acid having 12 to 20 carbon atoms. Specific examples include glycerol monooleate and glycerol monolaurate.

As the ether compound of glycerin, an ether compound in which not all hydroxyl groups form an ether bond is preferred. Glycerol alkyl ether or glycerol alkenyl ether is preferred, whose alkyl group or alkenyl group preferably has 12 to 20 carbon atoms, and specific examples include glycerol monooleyl ether and glycerol monolauryl ether.

The content of the glycerin derivative is preferably 0.005 to 1.0% by mass, more preferably 0.01 to 0.5% by mass, and further more preferably 0.02 to 0.2% by mass based on the total amount of the refrigerating machine oil. If the content is smaller than the lower limit of the above-described range, the abrasion resistance effect tends to be smaller, and if it exceeds the upper limit, there is a tendency that the additive is easily precipitated at a low temperature.

Furthermore, the refrigerating machine oil of the present embodiment preferably further comprises a phosphorus compound from the viewpoint of improvement of the abrasion resistance. As the phosphorus compound, at least one phosphorus compound selected from a mono(alkylphenyl) diphenyl phosphate having one alkyl group having 3 to 5 carbon atoms, a di(alkylphenyl) phenyl phosphate having two alkyl groups having 3 to 5 carbon atoms, and a tri(alkylphenyl) phosphate having three alkyl groups having 3 to 5 carbon atoms is particularly preferred.

Examples of the mono(alkylphenyl) diphenyl phosphate having one alkyl group having 3 to 5 carbon atoms include isopropylphenyl diphenyl phosphate, tert.-butylphenyl diphenyl phosphate, and n-butylphenyl diphenyl phosphate.

Examples of the di(alkylphenyl) diphenyl phosphate having two alkyl groups having 3 to 5 carbon atoms include di(isopropylphenyl) phenyl phosphate, di(tert.-butylphenyl) phenyl phosphate, and di(n-butylphenyl) phenyl phosphate.

Examples of the tri(alkylphenyl) diphenyl phosphate having three alkyl groups having 3 to 5 carbon atoms include tri(isopropylphenyl) phosphate, tri(tert.-butylphenyl) phosphate, and tri(n-butylphenyl) phosphate.

In the present embodiment, any one of the above-described mono(alkylphenyl) diphenyl phosphate, di(alkylphenyl) phenyl phosphate and tri(alkylphenyl) phosphate may be used, or a mixture of two or more of them may be used.

The content of the phosphorus compound is preferably 0.05 to 3.0% by mass, more preferably 0.1 to 2.0% by mass, and further more preferably 0.2 to 1.0% by mass based on the total amount of the refrigerating machine oil. If the content is smaller than the lower limit of the above-described range, the abrasion resistance effect tends to be smaller, and if it exceeds the upper limit, the stability of the refrigerating machine oil tends to be lowered.

Triphenyl phosphate (TPP) or tricresyl phosphate (TCP) may be used as the phosphorus compound in the present embodiment, but the TPP and the TCP are liable to increase a friction coefficient although they show the abrasion resistance effect. On the other hand, if at least one selected from the aforementioned mono(alkylphenyl) diphenyl phosphate, di(alkylphenyl) phenyl phosphate and tri(alkylphenyl) phosphate is used, not only the abrasion resistance effect is attained but also the friction coefficient can be retained low, and hence such a compound is preferred from the viewpoint of the power saving.

Besides, the refrigerating machine oil of the present embodiment preferably contains a stability improving additive for further improving the stability of a mixture of the refrigerant and the refrigerating machine oil in actual use. As the stability improving additive, at least one selected from a hindered phenol compound, an aromatic amine compound, an epoxy compound and a carbodiimide is preferred, and addition of an epoxy compound and a carbodiimide in combination is more preferred. These additives are added sufficiently in a content of 0.05 to 5.0% by weight in total based on the total amount of the refrigerating machine oil.

As the hindered phenol compound, 2,6-di-tert.-butyl phenol, 2,6-di-tert.-butyl-p-cresol, 4,4-methylene-bis-(2,6-di-tert.-butyl-p-cresol) and the like are suitable, as the aromatic amine compound, α-naphthylamine, p,p'-di-octyl-diphenylamine and the like are suitable, and as the epoxy compound, a glycidyl ether group-containing compound, an epoxidized fatty acid monoester, an epoxidized fat or oil, an epoxy cycloalkyl group-containing compound and the like are suitable.

Moreover, additives such as an anti-wear agent like an organic sulfur compound, an oiliness agent like an alcohol or a higher fatty acid, a metal deactivator like a benzotriazole derivative, and an antifoaming agent like silicone oil may be appropriately added.

The refrigerating machine oil of the present embodiment is preferably used as a lubricating oil for a refrigerating machine in which a hydrocarbon refrigerant having 2 to 4 carbon atoms is used. Here, if the refrigerating machine oil of the present embodiment is applied to a refrigerating machine in which isobutane is used as a refrigerant, it is also necessary to have a characteristic suitable to a motorized (hermetic) compressor, namely, a high electrical insulating property. Therefore, the refrigerating machine oil of the present invention preferably has, after adding an additive, a volume resistivity of $10^9$ Ω·m or more. A volume resistivity herein means a value measured in accordance with JIS C2101. Besides, if an additive is used, the volume resistivity means a volume resistivity of the refrigerating machine oil attained after adding the additive thereto.

[Embodiment 2: Working Fluid Composition for Refrigerating Machine]

A working fluid composition for a refrigerating machine according to Embodiment 2 of the present invention comprises: a refrigerating machine oil comprising a mineral oil and an alkylbenzene in a mass ratio, the mineral oil/the alkylbenzene, of 85/15 to 15/85, wherein the mineral oil has a % $C_N$ by n-d-M ring analysis of 20 to 60, a pour point of −15° C. or less and a kinematic viscosity at 40° C. of 1.5 to 15 mm$^2$/s; and a hydrocarbon refrigerant having 2 to 4 carbon atoms, wherein the refrigerating machine oil has a kinematic viscosity at 40° C. of 2 to 12 mm$^2$/s and a flash point of 120° C. or more. The refrigerating machine oil contained in the working fluid composition for a refrigerating machine of the present embodiment is the same as the refrigerating machine oil according to Embodiment 1 described above, and hence redundant description will be herein omitted.

Specific examples of the hydrocarbon refrigerant having 2 to 4 carbon atoms in the present embodiment include ethane, propane, n-butane and isobutane. In particular, a hydrocarbon refrigerant such as isobutane (R600a) which has been used for a cold storage chamber, and propane (R290) which has been examined for practical use for a room air conditioner can be suitably used in the present embodiment. Particularly, the working fluid composition for a refrigerating machine of the present embodiment can achieve the power saving by lowering the viscosity of the refrigerating machine oil, and therefore is suitable for a cold storage chamber in which a reciprocating compressor, where this effect is largely shown, is mainly used, and more particularly, is suitable for an isobutane refrigerant.

In the working fluid composition for a refrigerating machine of the present embodiment, a content ratio between the refrigerant and the refrigerating machine oil is not especially limited, and the refrigerant/the refrigerating machine oil is preferably 10/90 to 90/10, and more preferably 30/70 to 70/30.

EXAMPLES

The present invention will now be more specifically described by way of examples and comparative examples, but it is noted that the present invention is not limited to the following examples at all.

Example 1

A mineral oil having a kinematic viscosity at 40° C. of 3.4 mm²/s, a flash point of 108° C., a % $C_N$ by the n-d-M ring analysis of 40, and a pour point of −50° C. or less (VG3 base oil manufactured by JX Nippon Oil & Energy Corporation, hereinafter referred to as the "mineral oil A") and an alkylbenzene having a kinematic viscosity at 40° C. of 4.5 mm²/s and a flash point of 158° C. (linear alkylbenzene manufactured by JX Nippon Oil & Energy Corporation, hereinafter referred to as the "LAB") were mixed in a mass ratio of the mineral oil A/LAG=30/70 to obtain a refrigerating machine oil having a kinematic viscosity at 40° C. of 4.1 mm²/s, a flash point of 136° C. and a pour point of −50° C.

Examples 2 to 10 and Comparative Examples 1 to 6

In Examples 2 to 10 and Comparative Examples 1 to 6, the above-described mineral oil A and LAB, and the following mineral oils and additives were used to obtain refrigerating machine oils respectively having compositions shown in Tables 1 to 4. The kinematic viscosities at 40° C., the flash points and the pour points of the obtained refrigerating machine oils are also shown in Tables 1 to 4.

(Base Oil)

Mineral oil B: a mineral oil having a kinematic viscosity at 40° C. of 6.5 mm²/s, a flash point of 116° C., a % $C_N$ by the n-d-M ring analysis of 47, and a pour point of −50° C. or less (VG7 base oil manufactured by JX Nippon Oil & Energy Corporation)

Mineral oil C: a mineral oil having a kinematic viscosity at 40° C. of 8.7 mm²/s, a flash point of 130° C., a % $C_N$ by the n-d-M ring analysis of 57, and a pour point of −50° C. or less (VG8 base oil manufactured by JX Nippon Oil & Energy Corporation)

PAO: poly-α-olefin having a kinematic viscosity at 40° C. of 5.2 mm²/s, a flash point of 194° C., a % $C_N$ by the n-d-M ring analysis of 11, and a pour point of −50° C. or less (Additive)

GMO: glycerol monooleate

GMOE: glycerol monooleyl ether

TBPP: tert.-butylphenyl phosphate (a mixture of tert.-butylphenyl diphenyl phosphate and di(tert.-butylphenyl) phenyl phosphate in a mass ratio of 2/1

TABLE 1

| | Item | Example 1 | Example 2 | Example 3 | Example 4 | Example 5 |
|---|---|---|---|---|---|---|
| Base oil | Type (mass ratio) | Mineral oil A/LAB (30/70) | Mineral oil A/LAB (50/50) | Mineral oil B/LAB (50/50) | Mineral oil B/LAB (60/40) | Mineral oil A/LAB (40/60) |
| | Content | 100 | 100 | 100 | 100 | 99.9 |
| Additive | GMO, mass % | — | — | — | — | 0.1 |
| | GMOE, mass % | — | — | — | — | — |
| | TBPP, mass % | — | — | — | — | — |
| Kinematic viscosity at 40° C., mm²/s | | 4.3 | 4.0 | 5.4 | 5.5 | 4.2 |
| Flash point, ° C. | | 136 | 130 | 134 | 130 | 132 |
| Pour point, ° C. | | −50 | −50 | −50 | −50 | −50 |

TABLE 2

| | Item | Example 6 | Example 7 | Example 8 | Example 9 | Example 10 |
|---|---|---|---|---|---|---|
| Base oil | Type (mass ratio) | Mineral oil A/LAB (50/50) | Mineral oil B/LAB (50/50) | Mineral oil C/LAB (50/50) | Mineral oil C/LAB (20/80) | Mineral oil C/LAB (20/80) |
| | Content | 99.9 | 99.5 | 100 | 100 | 99.5 |
| Additive | GMO, mass % | — | — | — | — | — |
| | GMOE, mass % | 0.1 | — | — | — | — |
| | TBPP, mass % | — | 0.5 | — | — | 0.5 |
| Kinematic viscosity at 40° C., mm²/s | | 4.0 | 5.4 | 5.9 | 4.8 | 4.8 |
| Flash point, ° C. | | 130 | 134 | 149 | 153 | 153 |
| Pour point, ° C. | | −50 | −50 | −50 | −50 | −50 |

TABLE 3

| Item | | Comparative Example 1 | Comparative Example 2 | Comparative Example 3 |
|---|---|---|---|---|
| Base oil | Type (mass ratio) | Mineral oil A (100) | Mineral oil B (100) | Mineral oil A/LAB (90/10) |
| | Content, mass % | 100 | 100 | 100 |
| Additive | GMO, mass % | — | — | — |
| | GMOE, mass % | — | — | — |
| | TBPP, mass % | — | — | — |
| Kinematic viscosity at 40° C., mm$^2$/s | | 3.4 | 6.5 | 3.5 |
| Flash point, ° C. | | 108 | 116 | 110 |
| Pour point, ° C. | | −50 | −50 | −50 |

TABLE 4

| Item | | Comparative Example 4 | Comparative Example 5 | Comparative Example 6 |
|---|---|---|---|---|
| Base oil | Type (mass ratio) | Mineral oil B/LAB (10/90) | LAB (100) | PAO (100) |
| | Content, mass % | 100 | 100 | 100 |
| Additive | GMO, mass % | — | — | — |
| | GMOE mass % | — | — | — |
| | TBPP, mass % | — | — | — |
| Kinematic viscosity at 40° C., mm$^2$/s | | 4.7 | 4.5 | 5.2 |
| Flash point, ° C. | | 150 | 158 | 194 |
| Pour point. ° C. | | −50 | −50 | −50 |

Next, the refrigerating machine oils of Examples 1 to 10 and Comparative Examples 1 to 6 were subjected to the following evaluation tests.

(Lubricity)

In accordance with ASTM D-3233-73, a Falex burning load was measured initially at 50° C. and 290 rpm under an atmosphere where the blowing of a refrigerant R600a was controlled (to 70 ml/min).

Besides, a Falex wear test was performed at 50° C. and 290 rpm under a load of 50 Lbf for 5 minutes in a break-in period and under a load of 100 Lbf for 1 hour in an actual test, and the result was shown as a total wear amount (in mg) of a vane and a block obtained after the test.

The test load was set to be low for setting a condition ranging from a mixed lubrication region to a mild boundary lubrication region.

The obtained results are shown in Tables 5 and 6.

(Thermal Stability)

In accordance with ANSI/ASHRAE 97-1983, a stainless steel cylinder (100 ml) was charged with each sample oil (20 g), the refrigerant R600a (20 g) and a catalyst (a wire of iron, copper or aluminum), the resulting cylinder was heated to 175° C., and after retaining the resultant for 14 days, a color tone (according to ASTM) and an acid value of the sample oil were measured. The obtained results are shown in Tables 5 and 6.

(Electrical Insulating Property)

In accordance with JIS C2101, the volume resistivity at 80° C. was measured. The obtained results are shown in Tables 5 and 6.

TABLE 5

| Item | Example 1 | Example 2 | Example 3 | Example 4 | Example 5 | Example 6 | Example 7 | Example 8 | Example 9 | Example 10 |
|---|---|---|---|---|---|---|---|---|---|---|
| Lubricity, Falex burning load, Lbf | 350 | 330 | 400 | 410 | 490 | 510 | 530 | 480 | 380 | 500 |
| Lubricity, Falex wear, mg | 6.7 | 5.8 | 4.9 | 4.7 | 2.1 | 2.0 | 1.7 | 4.2 | 4.5 | 2.0 |
| Thermal stability (175° C., after 14 days) | | | | | | | | | | |
| color tone (ASTM) | L1.0 | L1.0 | L1.0 | L1.0 | L1.0 | L1.0 | L1.0 | L1.0 | L1.0 | L1.0 |
| total acid value, mgKOH/g | 0.01 | 0.01 | 0.01 | 0.01 | 0.01 | 0.01 | 0.01 | 0.01 | 0.01 | 0.01 |
| Electrical insulating property volume resistivity (80° C.), TΩ · m | 0.017 | 0.018 | 0.016 | 0.018 | 0.011 | 0.011 | 0.010 | 0.018 | 0.019 | 0.010 |

TABLE 6

| Item | Comparative Example 1 | Comparative Example 2 | Comparative Example 3 | Comparative Example 4 | Comparative Example 5 | Comparative Example 6 |
|---|---|---|---|---|---|---|
| Lubricity, Falex burning load, Lbf | 360 | 430 | 330 | 150 | 120 | 100 |
| Lubricity, Falex wear, mg | 5.4 | 4.3 | 5.6 | Seizure caused in actual test | Seizure caused in actual test | Seizure caused in actual test |
| Thermal stability (175° C., after | | | | | | |

TABLE 6-continued

| Item | Comparative Example 1 | Comparative Example 2 | Comparative Example 3 | Comparative Example 4 | Comparative Example 5 | Comparative Example 6 |
|---|---|---|---|---|---|---|
| 14 days) | | | | | | |
| color tone (ASTM) | L1.0 | L1.0 | L1.0 | L1.0 | L1.0 | L1.0 |
| total acid value, mgKOH/g | 0.01 | 0.01 | 0.01 | 0.01 | 0.01 | 0.01 |
| Electrical insulating property volume resistivity (80° C.), TΩ·m | 0.017 | 0.018 | 0.016 | 0.018 | 0.011 | 0.011 |

As is understood from Tables 1 to 6, all the refrigerating machine oils of Examples 1 to 10 and Comparative Examples 1 to 6 have the low-temperature characteristic corresponding to the pour point, the thermal stability and the electrical insulating property at a sufficient level required as a refrigerating machine oil.

The refrigerating machine oils of Comparative Examples 1 to 3 have, however, a flash point, used as a target for the safety, lower than 120° C., and since the drying process at approximately 120° C. is performed after injecting the refrigerating machine oil in producing a compressor, these oils are too dangerous to use. On the other hand, the refrigerating machine oils of synthetic oil type of Comparative Examples 4 to 6 have sufficiently high flash points but are so inferior in the lubricity that seizure was caused in the wear test performed under a comparatively low load. Specifically, if abrasion or seizure is caused in a sliding portion of a refrigeration compressor, a refrigeration cycle cannot function.

On the contrary, each of the refrigerating machine oils of Examples 1 to 10 has a flash point of 120° C. or more, has lubricity at level of a given burning load although the viscosity is low, and the wear amount is excellently as small as 10 mg or less. In particular, the lubricity of Examples 5, 6 and 10 in which an abrasion resistance additive is contained is excellent, but even if the low viscosity refrigerating machine oil of the present invention is used, a refrigerating machine is preferably designed, from the viewpoint of long-term reliability, to keep a sliding portion in an elastic fluid lubrication region so as to prevent the abrasion with the thickness of the oil film.

INDUSTRIAL APPLICABILITY

The refrigerating machine oil of the present invention is used as a lubricating oil for a refrigerating machine using a hydrocarbon refrigerant having 2 to 4 carbon atoms, such as isobutane, and in particular, can be used in a power saving refrigeration system with high cooling efficiency, in which a compressor, a condenser, a throttle device (a refrigerant flow control unit such as an expansion valve or a capillary tube), an evaporator and the like are provided and a refrigerant is circulated among these components, particularly as a lubricating oil in a refrigerating machine including a reciprocating type, a rotary type, a scroll type or a screw type compressor, and can be suitably used in a cold storage chamber, a room air conditioner, an industrial refrigerating machine and the like.

The invention claimed is:

1. A working fluid composition for a refrigerating machine comprising:
a refrigerating machine oil comprising a mineral oil and an alkylbenzene in a mass ratio, the mineral oil/the alkylbenzene, of 15/85 to 60/40, wherein the mineral oil has a % $C_N$ by n-d-M ring analysis of 20 to 60, a pour point of −15° C. or less and a kinematic viscosity at 40° C. of 1.5 to 15 mm²/s; and
a hydrocarbon refrigerant having 2 to 4 carbon atoms,
the refrigerating machine oil having a kinematic viscosity at 40° C. of 2 to 12 mm²/s and a flash point of 120° C. or more.

2. The working fluid composition for a refrigerating machine according to claim 1, wherein the alkylbenzene is a linear alkylbenzene in which a linear alkyl group is bonded to a benzene ring, and wherein a kinematic viscosity at 40° C. of the alkylbenzene is 2 to 10 mm²/s.

3. The working fluid composition for a refrigerating machine according to claim 1, wherein the % $C_N$ by the n-d-M ring analysis of the mineral oil is 40 to 60.

4. The working fluid composition for a refrigerating machine according to claim 1, further comprising at least one glycerin derivative selected from an ester compound of glycerin and an ether compound of glycerin, wherein a content of the glycerin derivative is 0.005 to 1.0% by mass based on a total amount of the refrigerating machine oil.

5. The working fluid composition for a refrigerating machine according to claim 1, further comprising at least one phosphorus compound selected from a mono(alkylphenyl) diphenyl phosphate having one alkyl group having 3 to 5 carbon atoms, a di(alkylphenyl) phenyl phosphate having two alkyl groups having 3 to 5 carbon atoms, and a tri(alkylphenyl) phosphate having three alkyl groups having 3 to 5 carbon atoms, wherein a content of the phosphorus compound is 0.05 to 3.0% by mass based on a total amount of the refrigerating machine oil.

6. The working fluid composition for a refrigerating machine according to claim 1, wherein the hydrocarbon refrigerant is isobutane.

7. A refrigerating machine oil for use with a hydrocarbon refrigerant having 2 to 4 carbon atoms, comprising:
a mineral oil and an alkylbenzene, in a mass ratio, the mineral oil/the alkylbenzene, of 15/85 to 60/40, wherein the mineral oil has a % $C_N$ by n-d-M ring analysis of 20 to 60, a pour point of −15° C. or less and a kinematic viscosity at 40° C. of 1.5 to 15 mm²/s,
the refrigerating machine oil having a kinematic viscosity at 40° C. of 2 to 12 mm²/s and a flash point of 120° C. or more.

8. A method for manufacturing a refrigerating machine oil for use with a hydrocarbon refrigerant having 2 to 4 carbon atoms, comprising:
mixing a mineral oil and an alkylbenzene in a mass ratio, the mineral oil/the alkylbenzene, of 15/85 to 60/40, to obtain a refrigerating machine oil comprising a mixed oil of the mineral oil and the alkylbenzene as a base oil and having a kinematic viscosity at 40° C. of 2 to 12 mm²/s and a flash point of 120° C. or more, wherein the mineral oil has a % $C_N$ by n-d-M ring analysis of 20 to 60, a pour point of −15° C. or less and a kinematic viscosity at 40° C. of 1.5 to 15 mm²/s.

* * * * *